Figure 1:
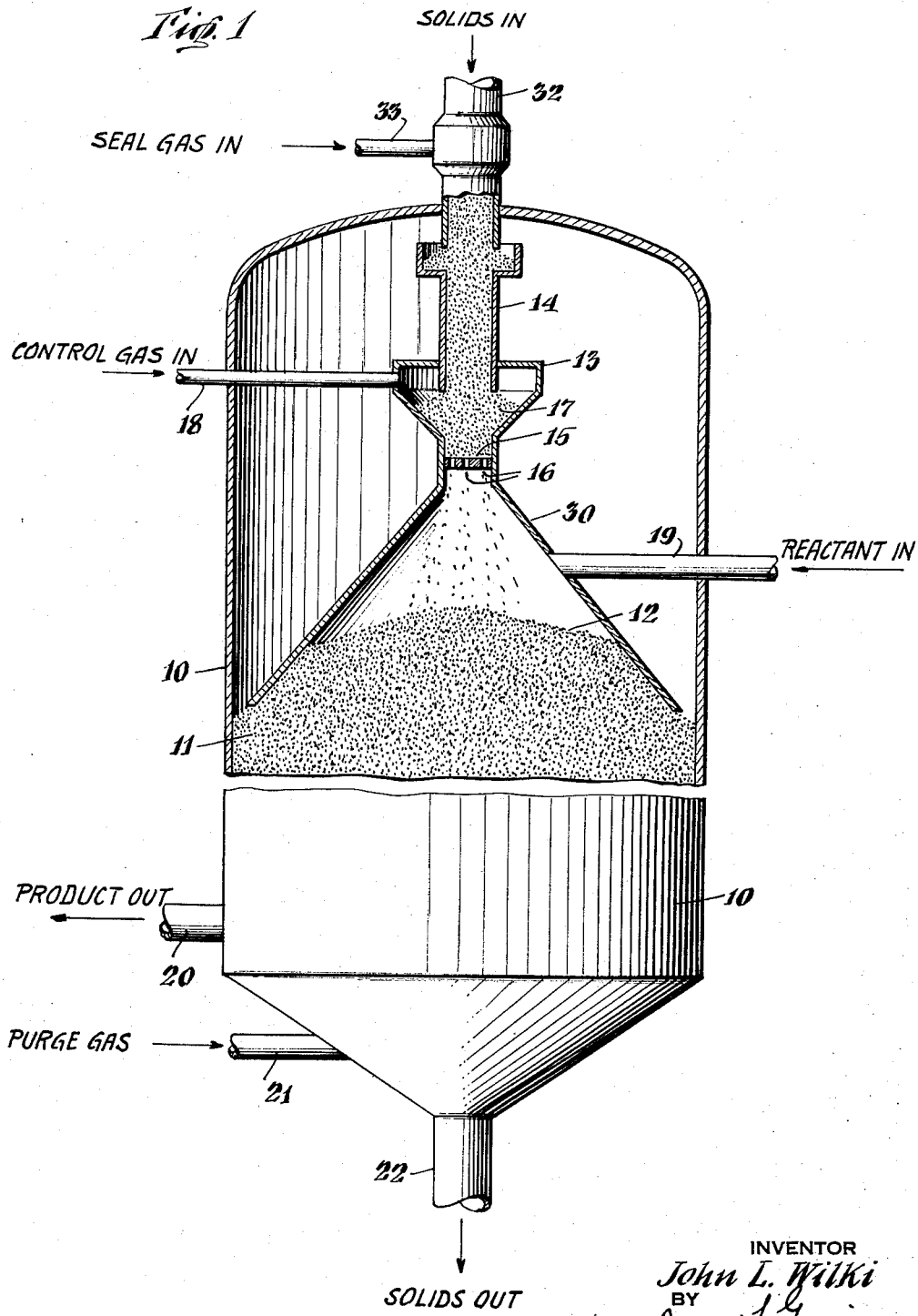

Sept. 8, 1959 J. L. WILKI 2,903,420
COMPACT MASS SURFACE LEVEL CONTROL
Filed Oct. 4, 1956 2 Sheets-Sheet 2

Fig. 2

INVENTOR
John L. Wilki
BY
Andrew L. Fabricant
ATTORNEY

United States Patent Office 2,903,420
Patented Sept. 8, 1959

2,903,420

COMPACT MASS SURFACE LEVEL CONTROL

John Leonard Wilki, Woodbury, N.J., assignor to Socony Mobil Oil Company, Inc., a corporation of New York Application October 4, 1956, Serial No. 613,905

9 Claims. (Cl. 208—167)

This invention deals with a method and apparatus for contacting of fluids and granular solids, wherein the granular solids exist as a downwardly moving, substantially compact bed. It is particularly concerned with a method and apparatus for feeding the solids to such a bed so as to automatically maintain the bed at a constant height and afford the opportunity of contacting all of the incoming solids with fluid reactant as the solids are supplied to the bed.

Typical of the processes to which this invention applies is the catalytic cracking of hydrocarbons in which a granular solid catalyst is moved through a reaction zone as a substantially compact bed of solids. A hydrocarbon reactant, which may be gaseous, liquid, or a mixture of the two, is supplied to the upper end of said bed and passed downwardly therethrough to effect the desired conversion. Used catalytic material is removed from the lower end of the bed and passed to a regeneration zone wherein it is reconditioned for re-use in the reaction zone.

Other processes in which this invention will be useful include the catalytic reforming, hydrocracking, isomerization and the like of fluid hydrocarbons utilizing a moving mass of granular catalyst. The invention will also find application in conversion processes utilizing moving masses of inert solids such as coking and in processes for the continuous treatment of liquid hydrocarbons by means of solid adsorbents.

The particular solid used will depend upon the reaction desired in every case. For example, in the catalytic cracking of hydrocarbons synthetic associations of silica, alumina and magnesia and combinations thereof have found favor. Certain metals and metallic oxides have at times been added to these materials to impart specific properties to them. Inert solids often take the form of refractory materials, stones, metallic particles and particles of coke. In liquid hydrocarbon percolation for color improvement, materials most frequently used are fuller's earth, bauxite and the like.

Contact material useful with this invention must be granular, that is, it must be of palpable particulate form generally of a size within the range 1 inch to 325 mesh by Tyler standard screen analysis. The contact material may be of any desired shape, either regular or irregular.

It is usual, in processes like the aforementioned, to maintain the bed surface below the upper end of the housing confining it. The space above the bed is then used for withdrawing or supplying fluid product or reactant. It is highly important, however, that the solids mass or bed be maintained at a reasonably constant height within the housing. Obviously, the amount of contacting which the fluid reactant receives is directly related to the distance which it travels through the contact material. If the bed is too high, the reactant will be over-contacted, and if it is too low, it will be under-contacted. The prior art contains a variety of suggestions for controlling this bed height. Some of these are only partially successful, others, while effecting good control of bed height, do so at the sacrifice of some other process variable. These prior art systems may be roughly grouped into two classes: (1) those which measure the bed height and adjust solids inlet or outlet flow rate to maintain constant height; (2) those which automatically maintain the height.

Typical of the former class is the prior art process which involves measuring bed height by measuring the pressure drop of a gas flowing upwardly through part of the bed and then adjusting the incoming solids rate by adjusting the pressure of a gas stream which is forcing the solids into the reactor to maintain the bed height constant. The difficulty with this type of system is that it requires expensive automatic controllers, and in one particular case it requires flowing a gaseous stream in a directly opposite direction to that of the general gas flow through the compact bed.

An example of the second type of operation is the process in which a part of the contact material is supplied directly to the surface of the bed as a plurality of compact streams while the remainder is showered down onto the bed surface. The contact material in the shower is sprayed with the incoming reactant. While this operation furnishes very positive control of the bed height, the contact material in the compact streams used as the control does not make initial contact with incoming reactant and is, therefore, at a different temperature and activity level than the remainder of the material when it reaches the bed. This will cause differing degrees of reaction, depending upon whether the reactant flows through portions of the bed supplied from the shower or from the compact streams.

The invention described herein combines the best features of both of these classes of prior art operations in that it provides positive automatic control of the bed height without expensive instruments to adjust flow rate and without differences in treatment of incoming contact material resulting from the bed height control.

A major object of this invention is to provide a method and apparatus for supplying granular contact material to a moving mass thereof which overcomes the above described difficulties.

Another object of this invention is to provide a method and apparatus for supplying contact material to a downwardly moving mass thereof which maintains the height of the mass substantially constant.

Another object of this invention is to provide a method and apparatus for the concurrent contacting of fluids with a downwardly moving, substantially compact mass of granular solids of substantially constant height.

Another object of this invention is to provide a method and apparatus for the uniform contacting of fluid hydrocarbons and granular contact material existing as a moving mass.

These and other objects of the invention will be more readily understood by referring to the description of the invention given hereinbelow.

Broadly, this invention provides for maintaining the upper surface of a substantially compact, downwardly moving mass of granular contact material at a substantially constant level within an enclosed housing. A compact accumulation of fresh contact material is maintained above the mass within a confined feeding zone. Fresh contact material is supplied to the accumulation and is removed from the lower end thereof as at least one narrow, confined, uniformly spaced stream. Contact material is discharged from this stream and showered down onto the surface of the mass. A control gas is supplied at a constant rate to the accumulation and at least part flows with said solids through the confined stream and downwardly into the mass while the remainder flows upwardly through the solids. No gaseous material is removed from the housing above the level of the mass, so that control gas must flow through the mass. It is removed from the lower section thereof. If the upper surface of the mass drops below the prescribed level, the resistance to flow of the mass will obviously be lower and control gas flow through the confined stream will increase, causing an increase in solids flow through the stream until the mass surface is restored to its normal level. If, on the other hand, the mass rises substantially above its normal level, the increased pressure drop will cause a decrease in the control gas flow through the confined stream and a resultant decrease in contact material flow through the stream until a normal bed height is resumed.

This invention will be better understood by referring to the attached drawings, of which:

Figure 1 is an elevational view, partially in section, of a hydrocarbon conversion reactor employing one form of this invention; and Figure 2 is an elevational view, partially in section, of the upper end of a hydrocarbon conversion reactor employing a second form of this invention.

Both of these drawings are diagrammatic in form and like parts in both bear like numerals.

Turning first to Figure 1, there is shown there an enclosed reaction vessel 10 which, throughout its lower section, acts as a conversion zone employing a compact bed or mass of contact material 11 with upper surface located at 12. A seal leg 32 extends downwardly into vessel 10 and discharges solids into open-topped receptacle 31. A feeding chamber 13 is located above mass surface 12. Conduit 14 is within the upper section of vessel 10 and extends vertically downwardly to terminate within the upper section of feeding chamber 13. The upper end of conduit 14 connects into the bottom of open-topped receptacle 31. The lower end of feeding chamber 13 is formed by a perforated partition 15 equipped with uniformly spaced orifices 16. Extending outwardly and downwardly from a level adjacent partition 15 are solid confining members 30.

In operation, granular contact material, at a temperature suitable to effect the desired conversion, enters vessel 10 through seal leg 32 and is discharged into open-topped receptacle 31. Seal leg 32 is supplied with an inert seal gas, such as steam or flue gas, adjacent its lower end at a pressure slightly in excess of the pressure in reactor 10 through conduit 33. Most of this seal gas flows upwardly through seal leg 32 but some will flow downwardly and discharge from the open upper surface of the contact material accumulation in receptacle 31. Contact material gravitates downwardly into feeding zone 13 through conduit 14. Within feeding zone 13 there is maintained a substantially compact accumulation of fresh contact material 17. A control gas is supplied to zone 13 through passageway 18 at a fixed rate. This gas is preferably inert to the granular solids used in the system. Suitable control gases include steam, flue gas and even light hydrocarbons. A part of the control gas flows downwardly through accumulation 17 and forces solids through orifices 16, while the remainder flows upwardly through passage 14 and is discharged through the top of receptacle 31. The solids drop as a freely falling shower onto surface 12 of mass 11. While falling the solids are confined by members 16, which extend to a level below the upper surface 12 of bed 11. Reactant is supplied through passage 19 and with the control gas flows into mass 11 and downwardly therethrough. Gas which has passed out of the open upper end of receptacle 31, flows around the outer edges of member 16 and through bed 11. The reactant is contacted or converted as desired and all products are removed through passage 20. Suitable product collection means well known to the art may be associated with conduit 20 to effect removal of all of the gaseous material. Used contact material flows downwardly and is purged free of associated hydrocarbons by means of a gas, such as steam, admitted through conduit 21. The used solids are then removed from the lower end of vessel 10 through conduit 22.

It will be noted that the only place at which gaseous material is removed is through conduit 20 at the lower end of reaction vessel 10 and mass 11. Thus, all fluid material must flow downwardly through mass 11.

The part of the control gas which flows upwardly through passage 14 will flow through a path of constant flow resistance independent of the surface level 12 so long as that level is above the lower ends of members 16. On the other hand, the portion of the control gas which flows downwardly through orifices 16 is subjected to a resistance to flow which varies directly with the height of mass surface 12, where the level of product withdrawal is not varied. Therefore, when the level of surface 12 drops the fraction of the constant volume of control gas which flows downwardly through orifices 16 must increase because of the lowered flow resistance of that path. This increase in gas flow will cause an increase solids flow through orifices 16 and will raise the surface level 12. When the surface 12 goes above its prescribed level the converse situation obtains and solids flow through orifices 16 decreases until the normal height is re-established.

Turning now to Figure 2, the use of this invention in a hydrocarbon conversion process employing a hydrocarbon charge at least partially in the liquid phase, is shown. This invention not only effectively controls the bed height in this operation, but makes it possible to contact all of the incoming solids with the liquid reactant as they are supplied to the mass, something which was not possible in the prior art system employing a falling shower of catalyst to effect liquid-solids mixture. In the system of Figure 2 the solids enter the reaction vessel 10 through a seal leg 32 and are discharged into receptacle 31, from which they flow through conduit 14 into feeding zone 13, which is substantially less in cross-sectional area than mass 11. Attached to the lower end of feeding zone 13 is a funnel-shaped member 22. As the solids drop through orifices 16 they flow through the funnel-shaped member onto the surface 12 of bed 11. A reactant inlet conduit 23 passes into vessel 10 and its lower section is located concentrically within the spout of funnel member 22. Conduit 23 is of substantially less cross-section than the spout 34 of member 22, so that an annular space 24 is formed between the two. A baffle member 25 is provided immediately beneath the discharge end of conduit 23.

The apparatus of Figure 2 operates to maintain the bed surface 12 at constant level in the same manner as that of Figure 1. In Figure 2, however, all of the solids which are supplied to mass 12 must flow through annular space 24. The liquid hydrocarbon charge discharged from conduit 23 strikes baffle 25 and is deflected laterally into a showering contact material. This liquid will intimately mix with the contact material, and since it contacts all of the material passing to the bed, the temperature and relative activity of the contact material across the bed should be the same throughout.

Orifices 16 should be of a size suitable to flow granular solids without plugging and yet small enough that the control gas will affect the solids flow, thereby maintaining the desired bed height. Generally, for circular orifices, diameters within the size range 1.25 inches to 12 inches are satisfactory for use with solids of a size within the range 4 to 20 mesh by Tyler standard screen analysis. It is also possible to use one or more slots which preferably are annular in shape rather than circular orifices. Such slots should have hydraulic radii within the range 1 inch to 4 inches for 4 to 20 mesh material.

The number and size orifices to be used in any particular installation will vary, depending on the flow rate of solids desired, the bed height used, the control gas pressure and the control gas rate. In principle, the orifices should be designed to flow only a fraction of the required solids flow when there is no control gas flow. One design made sized these orifices to flow seventy-five percent of the design flow rate when there was no control gas flow. It is contemplated that the solids flow without control gas may be as little as fifty percent of the design flow rate.

Selection of the control gas rate for any given system is also determinable by routine experimentation. The lower the hydraulic radii of the orifices or slots used the more sensitive to changes in bed height the catalyst flow through the orifices will be. However, there is no sharp decline in sensitivity as the hydraulic radii are increased.

This invention applies whether the reactant is gaseous or liquid. Likewise, the control fluid may be either a gas or a liquid. Of course, where the reactant flows through the solids bed as a liquid, it is better to use a liquid control fluid and where the reactant passes through the bed as a gas, a gaseous fluid is preferred.

The proper design of confining members 30 is very important to this invention. The bed level 12 must never drop below the lower ends of these members or the control gas will not operate to maintain the bed height. There must always be contact between members 16 and the bed surface, and there must be a space between members 16 and the walls of reactor 10 for gas flow. Members 16 should slope at angles greater than the angle of repose of the contact material. Most contact materials have an angle of repose of about 30 degrees.

The control fluid should preferably be a fluid which is inert to the particular solid being used. Steam may readily be used in gaseous systems. Also, flue gas and light hydrocarbons may be desirable here. In liquid systems, a liquid hydrocarbon may act as control fluid.

In a less preferred form of this invention the control gas may be introduced at constant pressure rather than constant rate. This technique, however, requires more elaborate instrumentation than the use of a constant rate system. The operation with constant pressure is substantially the same as described in connection with Figure 1, with the variations in control gas flow through orifices 16 resulting from the variation in gas flow to maintain the constant pressures.

The apparatus of this invention includes a variety of shapes in addition to the circular shapes described. For example, the reactor vessel and associated parts may be rectangular or hexagonal as may annular space 24. The term "annular" is used herein broadly to refer to the space between two objects placed one within the other, whether they are of circular or other shape and whether both objects are the same shape or not.

*Example*

In one design according to this invention the reactor vessel was 16 feet in diameter and designed generally along the lines shown in Figure 2. Feeding chamber 13 was 5 feet in diameter and 5 feet high from the level of partition 15. Funnel 22 was also 5 feet high and had a spout made of 24 inch pipe. Reactant pipe 23 was a 10 inch pipe. Partition 15 was equipped with 147 uniformly spaced orifices, each 2 inches in diameter. This unit was designed as a catalytic cracking reactor to process 15,000 barrels per day of a mixed phase charge at a catalyst circulation rate of 450 tons per hour. The catalyst was a commercial synthetic silica-alumina catalyst of a size ranging from 4 to 20 mesh Tyler. Steam was used as control gas and supplied at 25 pounds per square inch. A catalyst bed of 10 feet was to be used in the reactor. The steam used as the control gas would be supplied at the rate of 2,100 pounds per hour.

It should be understood that it is intended to cover herein all changes and modifications of the examples of this invention chosen for purposes of disclosure which do not constitute departures from the spirit and scope of the invention.

I claim:
1. A method for automatically maintaining substantially constant the surface level of a downwardly gravitating, substantially compact bed of granular solids, which comprises: maintaining a downwardly gravitating, substantially compact bed of granular solids within a confined contacting zone; maintaining a downwardly moving, substantially compact mass of granular solids within a confined feeding zone above said bed; continuously supplying granular solids to the upper end of said bed; continuously removing granular solids from the lower end of said mass as a plurality of confined streams which terminate above the upper surface of said bed; discharging granular solids onto the upper surface of said bed as a freely falling shower of solids, said shower containing all of the contact material to be supplied to the upper surface of said bed; maintaining gas impervious surfaces entirely around said shower and extending said surfaces downwardly to a level below the upper surface of said bed; supplying a control fluid at constant rate to said feeding zone and passing a first part of said fluid downwardly through said mass and through said streams into said contacting zone; said control fluid acting to increase the contact material flow in said streams beyond the flow rate which would be achieved under the influence of gravity alone; passing a second part of said control fluid around said streams and into said bed beneath the lower edges of said surfaces; supplying a fluid reactant to said contacting zone; flowing said reactant fluid and substantially all of said control fluid downwardly through said bed; maintaining the portion of said contacting zone above said mass fluid tight so that no fluid material is removed therefrom and removing fluid material from the lower section of said zone.

2. The process of claim 1, wherein the feeding zone is located within the housing at a level above the upper surface of the downwardly moving bed of granular solids, the feeding zone being of substantially less lateral dimensions than the bed.

3. In a process for the conversion of fluid hydrocarbons wherein the hydrocarbons are passed downwardly through a downwardly moving, substantially compact bed of granular contact material maintained within a confined conversion zone, the method for automatically maintaining the bed of contact material at a substantially constant height, which comprises: maintaining a substantially compact accumulation of contact material in a confined feeding zone situated above the upper surface of said mass; supplying fresh contact material to the upper surface of said accumulation; removing a plurality of narrow, uniformly spaced streams of contact material from the lower end of said accumulation, said streams being laterally confined from the level of the lower end of said accumulation to a level above said mass, the number and size of said streams being insufficient to supply under the influence of gravity alone all of the contact material required to be supplied to said surface in order to maintain said surface at a constant level; discharging the contact material from said streams and dropping the contact material after such discharge downwardly onto the upper surface of said bed as a freely falling shower; maintaining around said shower solid surfaces which slope downwardly and outwardly at angles greater than the angle of repose of the contact material and terminate at a level below the upper surface of said bed; supplying hydrocarbon charge, at least partially in the vapor phase, to the upper surface of said bed and passing said charge downwardly through the bed; supplying a control gas at a constant volumetric rate to said accumulation and flowing a first part of said gas through said confined streams of contact material, said gas causing the flow rate in said streams to exceed the flow rate which would exist under the influence of gravity alone to an amount sufficient to maintain said upper surface at a constant level; flowing a second part of said control gas.

around said streams and into said bed below the lower edges of said solid surfaces; removing gaseous material from said conversion zone only at the lower section thereof, whereby the contact material flow in said streams will be increased or decreased as the upper surface of said bed rises and falls and will thereby maintain said upper surface within a narrow range of levels.

4. A process for the conversion of fluid hydrocarbon charge by means of a downwardly moving, substantially compact bed of granular contact material, which comprises: maintaining said bed of contact material within the lower section of a confined conversion zone; maintaining a substantially compact accumulation of contact material of less horizontal cross-sectional area than said bed within a confined feeding zone situated above the upper surface of said bed; passing a stream of fresh contact material into said feeding zone and onto the upper surface of said accumulation; removing contact material from the lower section of said accumulation as a plurality of uniformly spaced, laterally confined streams of hydraulic radii within the range 1 inch to 4 inches, and discharging the contact material from said streams and dropping it onto the upper surface of said bed as a freely falling shower of contact material particles; maintaining the number and size of said laterally confined streams insufficient under the influence of gravity alone to supply the contact material needed to maintain the upper surface of said bed substantially constant; maintaining solid surfaces around said shower which slope at angles greater than the angle of repose and which extend downwardly to a level below the surface of the bed; spraying a fluid hydrocarbon charge into this shower and passing said charge at least partially in the vapor phase into the upper surface of said bed; passing a control gas at constant rate into said feeding zone and flowing a first part thereof through said accumulation and said plurality of streams of contact material, thereby forcing contact material through said streams at a rate sufficient to maintain the surface level of said bed substantially constant; flowing the remainder of said control fluid around said streams and into said bed below the lower ends of said surfaces; flowing all fluid material which enters said conversion zone downwardly through said bed and removing fluid material from said conversion zone only at the lower section thereof, whereby said fluid hydrocarbon will be converted and said bed will remain at a substantially constant height.

5. A reactor suitable for the conversion of fluid hydrocarbons by means of a granular solid contact material, which comprises in combination: an enclosed reaction chamber, an enclosed open-topped feeding chamber of less lateral dimensions than said reaction chamber situated within the upper section of said reaction chamber; a solid supply conduit extending into the upper section of said feeding chamber and terminating therein on a downwardly facing open discharge end; a perforated partition extending laterally across said feeding chamber in its lower section, and perforations in said partition having hydraulic radii within the range 1 inch to 4 inches; members defining a passageway from the underside of said feeding chamber beneath said partition to the portion of the reaction chamber therebelow; means for supplying a control gas to said feeding chamber above said partition and below the open upper end of said feeding chamber; means for supplying hydrocarbon charge to the upper section of said reaction chamber and means for removing gaseous material only from the lower section of said reaction chamber.

6. An apparatus for the conversion of fluid hydrocarbons, at least partially in the liquid phase, into gaseous products, which comprises in combination: an enclosed reaction chamber; an enclosed open-topped feeding chamber situated within the upper section of said reaction chamber; means for supplying fresh granular contact material to said feeding chamber; a perforated partition extending laterally across the lower end of said feeding chamber having perforations of hydraulic radii within the range 1 inch to 4 inches; means for supplying at constant rate a control gas to said feeding chamber at a level intermediate its upper and lower ends; a funnel-shaped member attached by its upper end to the lower end of said feeding chamber and adapted to catch all contact material dropping from said perforations; a reactant feed conduit of less size than the spout of said funnel-shaped member extending into said reaction chamber and downwardly concentrically with the spout of said funnel so as to define an annular space between the outside of said conduit and the inside of said spout, said conduit terminating adjacent the lower end of said spout; a baffle member positioned beneath said conduit so as to deflect liquid reactant which issues therefrom laterally into contact material which has dropped from said perforations and through said annular space into the portion of the reaction chamber therebelow; means for removing gaseous material from the lower section of said chamber only and means for removing granular contact material from the lower section of said chamber.

7. An apparatus for the conversion of fluid hydrocarbons, which comprises in combination: an enclosed reaction chamber; an open-topped receptacle within the upper section of said chamber; means for supplying contact material to said receptacle; an enclosed feeding chamber beneath said receptacle; members defining a passageway for solids flow from said receptacle to said feeding chamber; means for supplying a control fluid to the upper section of said feeding chamber; a perforated partition extending horizontally across the lower end of said feeding chamber; solid confining members extending downwardly from said feeding chamber and terminating within the upper section of said reaction chamber with lower ends spaced away from the walls of the reaction chamber; and means for removing products of conversion from the lower section of the reactor.

8. A method for automatically maintaining substantially constant within an enclosed housing the surface level of a downwardly gravitating, substantially compact column of granular contact material from the lower end of which contact material is constantly being withdrawn, which comprises: maintaining a substantially compact accumulation of contact material within a confined feeding zone located above the upper surface of said column; passing all of the contact material to be supplied to the upper surface of said column from the lower end of said accumulation as a plurality of narrow confined streams and discharging the contact material from said streams above said column and showering said contact material as a freely falling shower downwardly onto the upper surface of said column; supplying a control gas to said accumulation above the inlets of said streams at a pressure such that a portion of said gas flows through said streams with said contact material and assists in forcing contact material downwardly in said streams, withdrawing said control gas from said column at an unvarying level in its lower section; maintaining the conditions of supply of said control gas such that the quantity of gas flowing through said streams varies with variation in the pressure drop between said streams and the level of gas withdrawal, whereby said flow of control gas through said streams will increase as the surface level of said column falls, thereby increasing contact material flow to said surface through said streams while said control gas flow through said streams will decrease as said column surface level increases, thereby decreasing contact material flow to said surface through said streams, whereby said control gas acts to maintain said column surface level substantially constant.

9. A method for maintaining substantially constant the surface level of a downwardly gravitating, substantially compact column of granular contact material within an enclosed housing, wherein contact material is continuously withdrawn from the lower section of said column, which comprises: maintaining within said housing above the upper surface of said bed a laterally confined, elongated, substantially compact accumulation of granular contact material of less horizontal cross-section than said housing and said column, so that a gas space surrounds said accumulation; maintaining the upper surface of said accumulation unconfined and in communication with said gas space; passing all of the contact material to be supplied to said column from the lower end of said accumulation through a plurality of narrow streams and discharging contact material from said streams above the upper surface of said column so that contact material particles shower downwardly onto said surface, the number and size of said streams being such that under the influence of gravity alone contact material would not flow through said streams in an amount equal to that withdrawn from the lower section of said column; injecting a control gas at a constant rate into said accumulation at an intermediate level, said rate being such that a portion of said gas flows upwardly through said accumulation and out of the open upper surface into said gas space while the remainder flows downwardly through said accumulation and said streams resulting in the contact material flow rate in said streams approximating the rate of withdrawal of contact material from said column; enclosing said falling shower of particles by means of gas impervious surfaces out of communication with the gas space to which said control gas issuing from the upper surface of said accumulation flows, said gas impervious surfaces extending downwardly to a level below the upper surface of said bed and laterally less than completely across said bed to said housing and withdrawing all of said control gas at an unvarying level in the lower section of said column, whereby as the column surface falls control gas flow through said streams increases, thereby increasing solids flow through said streams to said column surface, while as said column surface rises control gas flow through said streams decreases, thereby decreasing contact material flow through said streams to said surface, whereby said contact material flow to said surface is automatically adjusted to maintain said upper surface of said mass substantially constant.

References Cited in the file of this patent

UNITED STATES PATENTS

| | | |
|---|---|---|
| 2,558,769 | McKinney | July 3, 1951 |
| 2,574,503 | Simpson | Nov. 13, 1951 |
| 2,574,850 | Utterback et al. | Nov. 13, 1951 |
| 2,683,109 | Norris | July 6, 1954 |
| 2,704,739 | Bland | Mar. 22, 1955 |
| 2,732,331 | Wesh | Jan. 24, 1956 |
| 2,737,294 | McClure | Mar. 6, 1956 |
| 2,770,583 | Haddad | Nov. 13, 1956 |
| 2,799,625 | Drew | July 16, 1957 |